(12) United States Patent
Lowery et al.

(10) Patent No.: US 9,345,228 B2
(45) Date of Patent: May 24, 2016

(54) BED AND METHOD OF MAKING THE BED

(71) Applicant: CozyDeck, LLC, Scottsdale, AZ (US)

(72) Inventors: Lu Ann Lowery, Scottsdale, AZ (US); Dean Heckler, Tempe, AZ (US)

(73) Assignee: CozyDeck, LLC, Scottsdale, AZ (US)

( * ) Notice: Subject to any disclaimer, the term of this patent is extended or adjusted under 35 U.S.C. 154(b) by 79 days.

(21) Appl. No.: 14/474,518

(22) Filed: Sep. 2, 2014

(65) Prior Publication Data
US 2016/0057970 A1 Mar. 3, 2016

(51) Int. Cl.
*A01K 1/035* (2006.01)

(52) U.S. Cl.
CPC .................................. *A01K 1/0353* (2013.01)

(58) Field of Classification Search
CPC ..................................................... A01K 1/0353
USPC ......................................... 119/28.5; D30/118
See application file for complete search history.

(56) References Cited

U.S. PATENT DOCUMENTS

| | | | |
|---|---|---|---|
| 1,820,284 A * | 8/1931 | Mills .................... | A01K 1/0353 119/28.5 |
| D157,319 S | 2/1950 | Bair | |
| 2,871,489 A * | 2/1959 | Emmert ................ | A47C 17/70 108/156 |
| 3,232,270 A * | 2/1966 | Sweeney, Jr. ........ | A01K 1/0353 119/28.5 |
| 3,552,356 A * | 1/1971 | Rosenthal ............ | A01K 15/025 119/28.5 |
| 3,592,143 A | 7/1971 | Krone | |
| 4,057,031 A * | 11/1977 | Williams ............. | A01K 1/0353 119/28.5 |
| 4,688,281 A * | 8/1987 | Lantz ................... | A47C 19/005 5/111 |
| D338,744 S * | 8/1993 | Marlon ................ | D30/118 |
| D346,704 S | 5/1994 | Grosfillex | |
| D358,283 S | 5/1995 | Kelly | |
| D364,977 S | 12/1995 | Hine | |
| D374,512 S | 10/1996 | Kiley et al. | |
| D379,682 S * | 6/1997 | Rafaat ................. | D21/797 |
| 5,860,389 A * | 1/1999 | Caldwell ............. | A01K 1/0353 119/28.5 |
| D408,555 S | 4/1999 | Albrecht | |
| D410,797 S | 6/1999 | Walters | |
| D435,993 S | 1/2001 | Johnson | |
| 6,220,205 B1 | 4/2001 | Massie | |
| 6,286,456 B1 * | 9/2001 | Michaelis ............ | A01K 1/0353 119/28.5 |
| D454,437 S | 3/2002 | Minneman | |
| 6,378,456 B1 | 4/2002 | Jerome | |
| D465,620 S * | 11/2002 | Stepp ................... | 119/28.5 |
| 6,591,778 B1 * | 7/2003 | Alderman ............ | A01K 1/0353 119/28.5 |
| 6,668,394 B2 * | 12/2003 | Walpin ................ | A01K 1/0353 119/28.5 |
| D540,950 S | 4/2007 | Johnson | |
| 7,431,679 B1 * | 10/2008 | Tageant .............. | A47C 19/024 482/27 |
| D582,168 S | 12/2008 | Sandel | |
| D591,013 S | 4/2009 | Mose | |

(Continued)

*Primary Examiner* — Yvonne Abbott-Lewis
(74) *Attorney, Agent, or Firm* — Robert D. Atkins; Atkins and Associates, P.C.

(57) ABSTRACT

A method of making a pet bed includes providing a rigid base, attaching a support member to the rigid base and attaching a cushion to the rigid base over the support member. The support member is configured to be removable. The cushion is configured to be removable. A tension of the support member is adjustable. The rigid base is washable. The support member is washable. The cushion is reversible. The cushion is washable. The rigid base is stackable. The pet bed includes a sleek, contemporary styling inspired by mid-century modern furnishings. The cushion functions as a crate cushion when traveling, providing the pet with familiar smells and reducing the stress of traveling on the pet. The pet owner adjusts the softness or firmness of the pet bed for the comfort of the individual pet by adjusting the tension of the support member.

6 Claims, 11 Drawing Sheets

(56) References Cited

U.S. PATENT DOCUMENTS

| | | |
|---|---|---|
| D591,912 S | 5/2009 | Drew |
| D604,463 S | 11/2009 | Pittman |
| D659,293 S | 5/2012 | Ferguson |
| D685,147 S | 6/2013 | Muir |
| 8,539,909 B2 * | 9/2013 | Williams ............ A01K 1/0353 119/28.5 |
| 2002/0096118 A1 * | 7/2002 | Kolozsvari ........... A01K 1/0353 119/28.5 |
| 2002/0096119 A1 * | 7/2002 | Kolozsvari ........... A01K 1/0353 119/28.5 |
| 2006/0021583 A1 * | 2/2006 | Jakubowski ......... A01K 1/0353 119/28.5 |
| 2008/0022934 A1 * | 1/2008 | Kruczek .............. A01K 1/0353 119/28.5 |
| 2011/0239946 A1 * | 10/2011 | Ogle .................... A01K 1/0353 119/28.5 |
| 2013/0276708 A1 * | 10/2013 | Wolfe, Jr. ............... A01K 15/02 119/28.5 |
| 2014/0190417 A1 | 7/2014 | Lipscomb et al. |

* cited by examiner

BED AND METHOD OF MAKING THE BED

FIELD OF INVENTION

The disclosure relates generally to bedding, and specifically, to beds for house pets such as dogs and cats.

BACKGROUND OF THE INVENTION

Families commonly keep dogs, cats, and other animals as pets. Over half of all American families own pets, and most consider their pets to be family members. Dogs are trained for recreational, sporting, or professional purposes. Dogs provide security to their owners. Cats are difficult to train, but instinctively help control the pest population in the home. Pets provide companionship to their owners. In return, pet owners provide food and shelter for their animals.

Pets generally live in the family home. Dogs and cats desire human companionship. Many dogs and cats attempt to sleep on the beds of their owners. Cats particularly enjoy being up above the ground. Pets bring dirt and fleas into their owners' beds. Accordingly, many pet owners provide each pet with a pet bed. Pet beds accumulate dirt, hair, dander, and oils from the pets' coats. Additionally, pet beds are prone to infestation by parasites such as fleas, ticks, and mites.

Many existing pet beds allow for a portion, such as the cover, to be removed and washed, but do not allow for the complete bed to be washed. Soils, pests, and odors penetrate the washable cover and accumulate in the un-washable interior portion of the pet bed. Other existing pet beds cannot be washed at all. Fleece pet beds, for example, are difficult to clean and cannot be washed because the fleece will mat up. Orthopedic pet beds utilize a memory foam which is not washable. A need exists for a pet bed that is entirely washable.

Another drawback of existing pet beds is appearance. Pet owners want to coordinate the pet bed with the existing decor in the home. Many existing pet beds resemble an overstuffed pillow. The stuffed pillow may be surrounded by a raised bumper. The stuffed pillow pet beds look out of place adjacent to sleek modern furnishings. Other existing pet beds resemble scaled down human couches. However, matching the styling and color palette of the pet bed couch with the family's existing couches presents a challenge to pet owners. A need exists for pet beds featuring sleek, clean lines and reversible cushions to coordinate with contemporary furnishings.

Pets' joints ache as the pet ages. Even with some cushioning, sleeping on the floor becomes uncomfortable for older pets. Also, the firmness of the floor is not adjustable. With pets of any age, sleeping on the floor is cold in the winter and stuffy in the summer. The couch-like pet beds advantageously raise the sleeping surface of the pet off the floor. However, the firmness of couch-like pet beds is not adjustable. A need exists for a pet bed that has an adjustable firmness.

Owners commonly travel with their pets. To ride on common carriers, pets are placed in crates. The crates are not the pets' primary bedding and have unfamiliar smells. A need exists for a pet bed with a removable cushion to pad the crate during travel and provide comfort and familiarity to the pet during stressful travel.

SUMMARY OF THE INVENTION

A need exists for an improved pet bed which is entirely washable, is stylish, allows the pet to rest comfortably off the ground, has an adjustable firmness, and has a removable cushion that functions as a crate cushion during travel. Accordingly, in one embodiment the present invention is a method of making a pet bed comprising the steps of providing a rigid base, attaching a support member configured to be removable to the rigid base, and attaching a cushion configured to be removable to the rigid base over the support member.

In another embodiment, the present invention is a method of making a pet bed comprising the steps of providing a rigid base, and attaching a support member configured to be removable to the rigid base.

In another embodiment, the present invention is a pet bed comprising a rigid base. A support member is attached to the rigid base. The support member is configured to be removable. A cushion is attached to the rigid base. The cushion is configured to be removable.

In another embodiment, the present invention is a pet bed comprising a rigid base. A support member is attached to the rigid base. The support member is configured to be removable.

DETAILED DESCRIPTION OF THE DRAWINGS

Aspects of one or more example embodiments are described in the following disclosure with reference to the Figures, in which like numerals represent the same or similar elements. While the described example embodiments include the best mode, it will be appreciated by those skilled in the art that it is intended to cover alternatives, modifications, and equivalents as may be included within the spirit and scope of the invention as set forth and defined by the appended claims and their equivalents as supported by the following disclosure and drawings.

In the present application, the terms "removably attach," "removably attaches," "removably attaching," "removably attached," and the combination of words "attached configured to be removable," means that the components may be attached, unattached, assembled, or disassembled, repeatedly, by hand, without tools, and without damaging any of the components. For example, in claim 1, attaching a support member configured to be removable to the rigid base means that the support member may be attached to the rigid base, or unattached from the rigid base, repeatedly, by hand, without tools, and without damaging the support member or the rigid base. Additionally, the support member and the rigid base may be assembled, or disassembled, repeatedly, by hand, without tools, and without damaging the support member or the rigid base.

Figure 1:
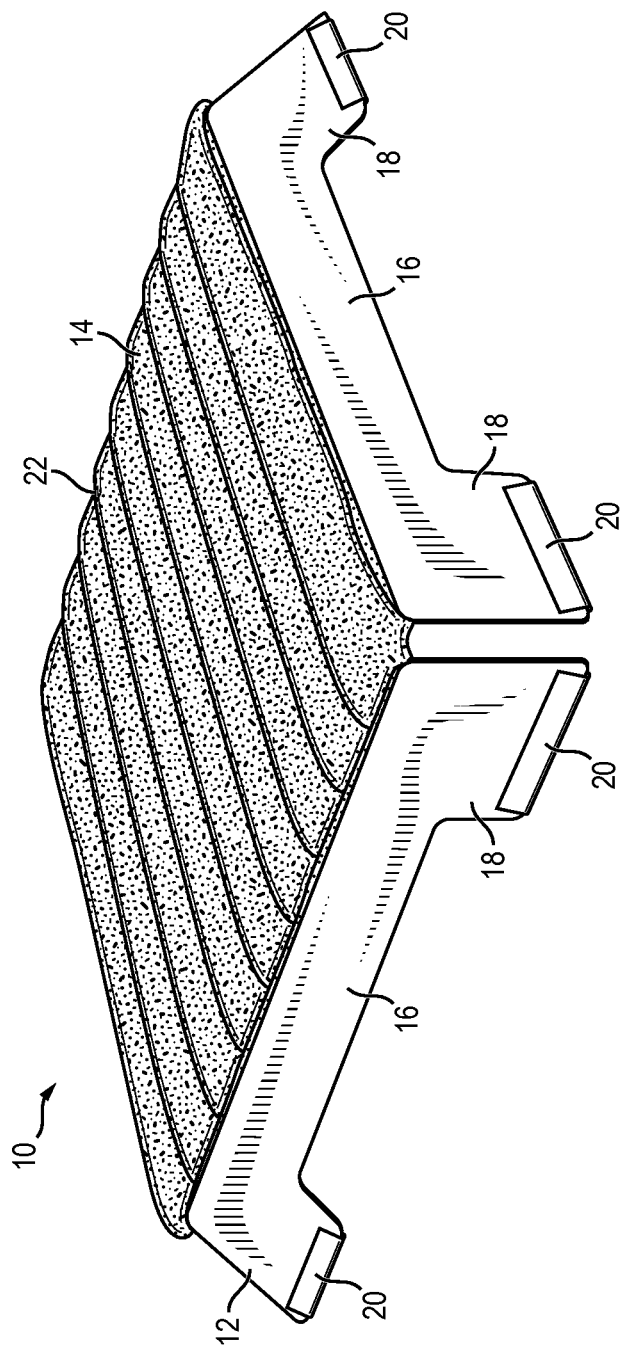
FIG. 1 illustrates a pet bed having sleek, clean lines and a reversible cushion.

FIG. 1 illustrates a perspective view of pet bed 10, including base 12 supporting cushion 14. In one embodiment, base 12 includes powder coated sheet metal. Base 12 is easy to clean. For example, base 12 is washable using a garden hose, with or without using soapy water and a sponge. Base 12 includes four legs 16. Legs 16 raise cushion 14 above the floor. Cushion 14 is reversible, meaning that both sides of the cushion are suitable for home decor. Cushion 14 includes two sides and a filling. The sides of cushion 14 include solid or print fabrics. Seams 22 are stitched into cushion 14 to prevent the filling from shifting, and provide an esthetically pleasing appearance. Cushion 14 is machine washable and dryable. Each leg 16 of base 12 includes two feet 18. Each foot 18 includes a bumper 20. Friction securely but removably attaches bumper 20 to foot 18. Bumper 20 includes polypropylene, polyethylene, nylon, polyvinyl chloride (PVC), polytetrafluoroethylene (PTFE), rubber, foam, felt, or other suitable materials. Bumper 20 is washable. Bumper 20 protects the floor from scratches and increases friction between feet 18 and the floor. By increasing friction between feet 18 and the floor, bumpers 20 help keep pet bed 10 in place as the pet enters and leaves the pet bed. Pet bed 10 includes a sleek, contemporary styling inspired by mid-century modern furnishings.

Figure 2:
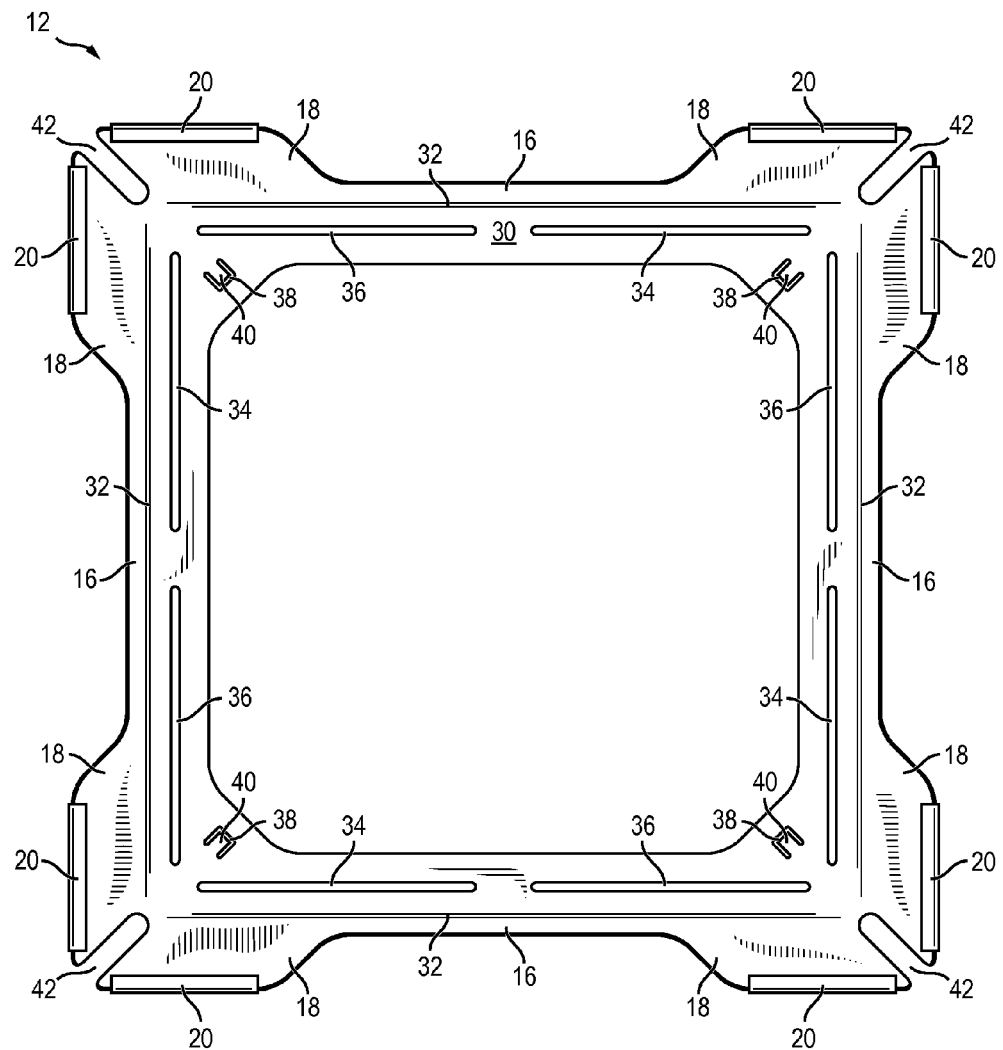
FIG. 2 illustrates a base of a pet bed.

FIG. 2 shows base 12. In one embodiment, base 12 is cut from a sheet of sheet metal. The sheet metal includes stainless steel, aluminum, brass, copper, iron, tin, nickel, and titanium. A template is cut to the shape of base 12 and laid over the sheet metal. Multiple sizes of templates are within the scope of the present invention, corresponding to multiple sizes of pet beds 10. The template for medium size pet bed 10 is sized to fit within the open interior portion of the template for large size pet bed 10. At least two pet bed templates are laid out on each piece of sheet metal. Because each sheet of sheet metal yields more than one pet bed 10, the costs of materials are reduced. The patterns from the templates are transferred onto the sheet metal. During fabrication, the sheet metal is cut according to the patterns transferred from the templates. Next, the work piece of cut sheet metal is transferred to a hydraulic computer controlled sheet metal brake. The work piece of cut sheet metal is clamped to the hydraulic computer controlled sheet metal brake. A computer precisely controls the angle of the bend. The work piece of cut sheet metal is bent slightly more than the desired final angle to allow for the metal to spring back slightly. In one embodiment, the desired final angle between leg 16 and the lower side of deck 30 is 60 degrees with a one degree tolerance. First leg 16 is bent along first edge region 32. The work piece of cut sheet metal is unclamped from the hydraulic computer controlled sheet metal brake and rotated into position for the next required bend. The process of clamping, bending, unclamping, and rotating, is repeated for the remaining required bends.

Next, the work piece of cut sheet metal is cleaned in preparation for powder coating. Residue from the cutting and bending processes are removed. Next, the work piece of cut sheet metal is powder coated. A dry paint powder is sprayed over all surfaces of the work piece of cut sheet metal. The dry paint powder is electrostatically charged to adhere to the work piece of cut sheet metal. Once all surfaces are covered, the work piece of cut sheet metal is baked. Baking causes the dry paint powder to melt and bond to the surface of the metal creating a smooth and tough finish. The powder coated work piece of cut sheet metal is base 12. A logo may optionally be applied to base 12 using a sticker, screen printing, or other suitable method.

Powder coated sheet metal represents one suitable material for base 12. However, base 12 may include any suitable material that is durable, washable, and rigid, including other metals or plastics. Sheet metal fabrication represents one suitable fabrication technique for base 12. However, base 12 may be fabricated using plastic injection molding, metal casting, welding, or other suitable techniques. Bumper 20 may be integrated into a plastic injection mold such that a separate bumper 20 is not required when base 12 includes a suitable plastic material fabricated using plastic injection molding.

Base 12 includes a square or rectangular shape. Base 12 includes an open interior portion surrounded by a peripheral region. Base 12 includes deck 30. Each leg 16 is bent or formed downward from deck 30 at edge region 32. Legs 16 elevate deck 30 from the floor. Deck 30 includes four dowel rod pocket channels 34 and four flap channels 36. Each side of deck 30 includes one dowel rod pocket channel 34 and one flap channel 36. Each dowel rod pocket channel 34 is directly across from a flap channel 36. Each corner of deck 30 includes a tab channel 38. Deck 30 includes four tab channels 38. Tab channel 38 surrounds three sides of tab 40. Tab 40 extends as a peninsula from a corner of deck 30 into tab channel 38. Tab 40 aligns with opening 42, formed between two adjacent legs 16. Base 12 is stackable. Because base 12 is stackable, costs of shipping and storing pet bed 10 are reduced. Additionally, the amount of retail shelf space required to market pet bed 10 is reduced.

Base 12 is sized for different sized pets. In one embodiment, base 12 is sized for a Great Dane, while in an alternate embodiment, the base is sized for a Pomeranian. More than one base 12 is fabricated from a single piece of sheet metal. For example, large size base 12 is 41.39 inches wide by 41.39 inches long, prior to bending legs 16. Finished large size base 12 is 37.95 inches wide by 37.95 inches long, measured at the lowest portion of the feet. Medium size base 12 is made from the sheet metal cut out to form the open interior portion of the large size base 12. Medium size base 12 is 28.8 inches wide by 28.8 inches long, prior to bending legs 16. Finished medium size base 12 is 25.64 inches wide by 25.64 inches long, measured at the lowest portion of the feet. Four or more small bases 12 are formed from a single piece of sheet metal.

Figure 3:
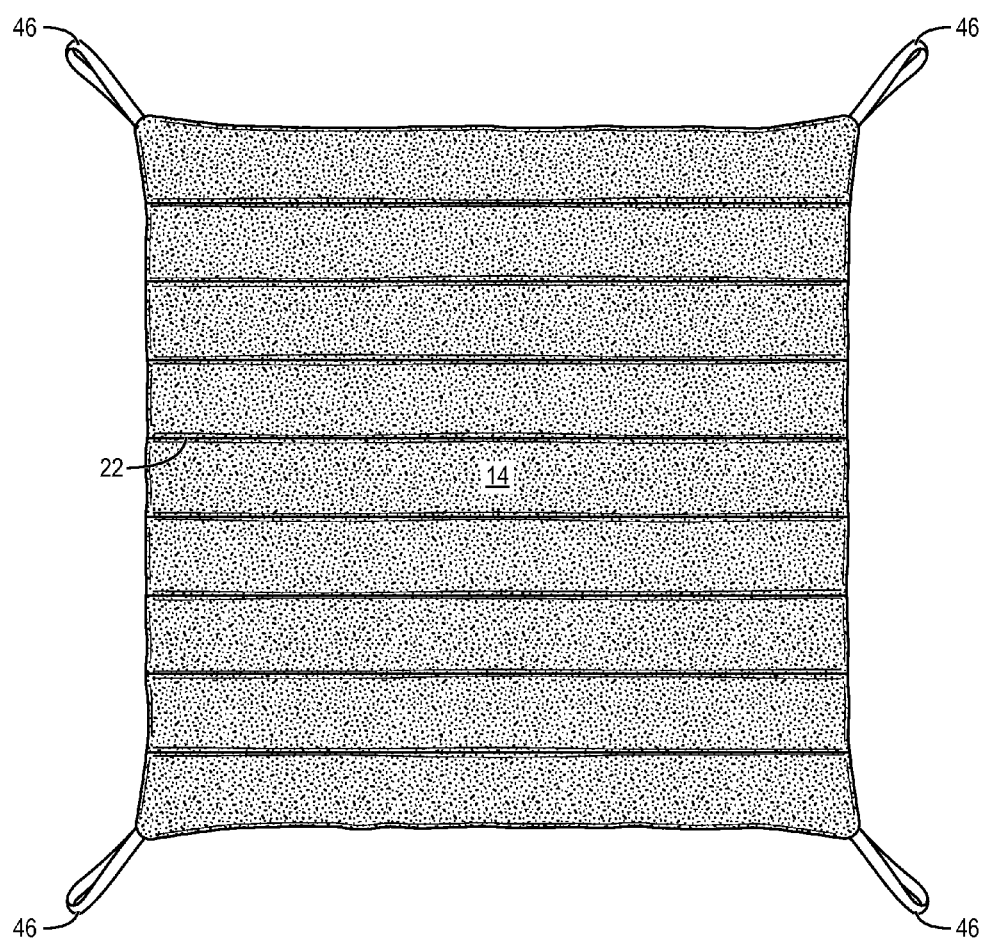
FIG. 3 illustrates a reversible cushion for a pet bed.

FIG. 3 shows cushion 14. Cushion 14 is reversible, meaning that both sides of the cushion are suitable for home decor. Cushion 14 includes two sides and a filling. The sides of cushion 14 include fabric suitable for home decor. A bolt of fabric is unrolled. A pattern corresponding to cushion 14 plus seam allowances is attached to the fabric by a suitable means, including pinning. The fabric is cut out according to the pattern. Similarly, a second piece of fabric is cut out according to the pattern. The first and second piece of fabric are cut from the same bolt. Alternatively, two different bolts of fabric are used, one for each side, to produce reversible cushion 14. The two pieces of fabric are aligned with the exterior sides of the fabric facing inward. Loops 46 are placed at each corner between the two exterior sides of fabric. The edges are stitched together. Stitching the edges together joins the first and second piece of fabric, and secures loops 46 in the corners. Less than the entire perimeter is sewn together, allowing an opening for filling. The exterior sides are pulled through the opening, exposing the exterior sides, while disposing the interior sides, the seams, and the raw edges, in the interior of the cushion. Filling material is disposed through the opening. Filling material includes polyester fiber fill or other suitable material that is machine washable and dryable. The filling material is evenly distributed in the cushion. The raw edges of the first and second piece of fabric at the opening are tucked into the opening. The opening provided for filling is sealed. Seams 22 are stitched into cushion 14 to prevent the filling from shifting, and provide an esthetically pleasing appearance. The styling of cushion 14, including seams 22, allows pet bed 10 to coordinate with contemporary furnishings, such as mid-century modern. Loops 46 are attached to each corner of cushion 14. Cushion 14 includes four loops 46. Loops 46 include fabric and elastic. Cushion 14 rests on top of support 50, and is secured with loops 46 to tabs 40 of base 12. Cushion 14 is machine washable and machine dryable. Alternatively, cushion 14 is air dried.

Owners commonly travel with their pets. To ride on common carriers, pets are placed in crates. The crates are not the pets' primary bedding and have unfamiliar smells. Cushion 14 is removable. Cushion 14 does not require base 12 and support 50 to function as a cushion. Accordingly, cushion 14 functions as a crate cushion when traveling. By functioning as a crate cushion, cushion 14 provides the pet with familiar smells and reduces the stress of traveling on the pet.

Figure 4:
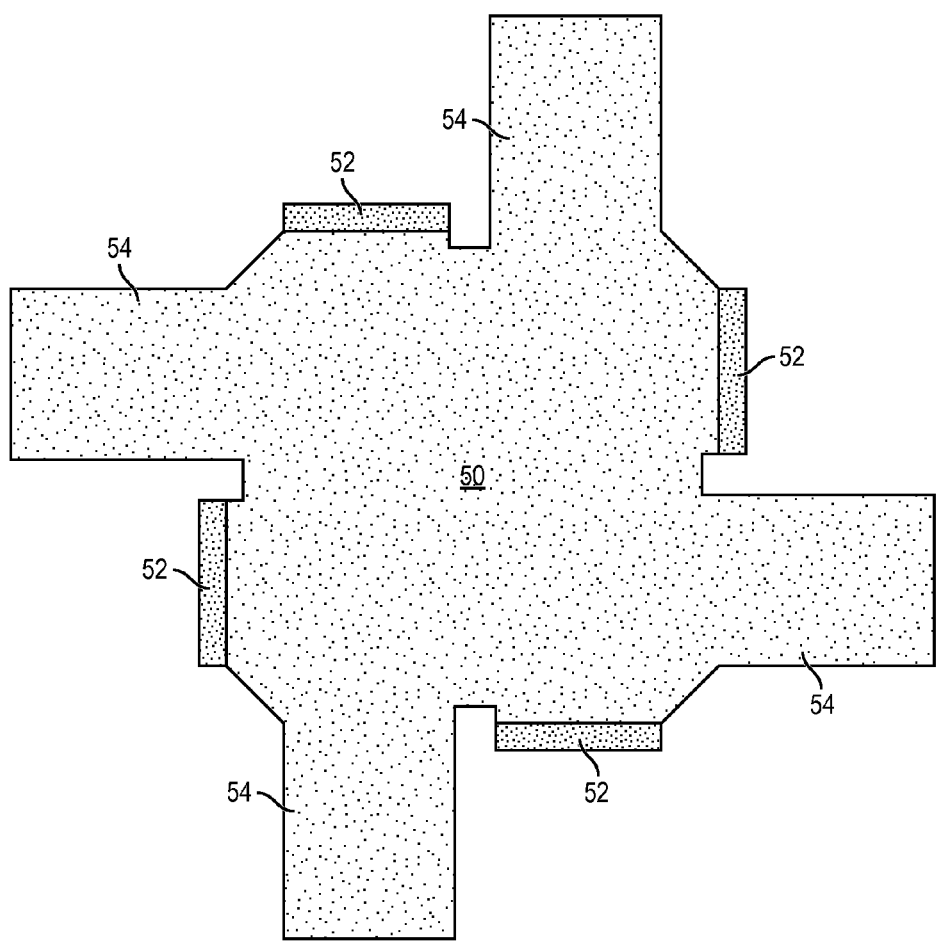
FIG. 4 illustrates a mesh support configured to be adjustably attached to a base for a pet bed.

FIG. 4 shows the top side of support 50. Support 50 includes polypropylene, polyethylene, nylon, PVC, PTFE, metal, or other suitable materials. Support 50 includes a mesh weave for excellent air flow and ease of air drying. The mesh weave of support 50 includes extruded diamond mesh netting, extruded square mesh netting, expanded mesh, and woven mesh fabrics. Support 50 provides support for cushion 14. Cushion 14 rests on top of support 50, and is securely but removably attached with loops 46 to tabs 40 of base 12. Support 50 includes four dowel rod pockets 52. Each side of support 50 includes a dowel rod pocket 52. Support 50 includes four flaps 54. Each side of support 50 includes a flap 54. Each dowel rod pocket 52 is directly across from a flap 54. Support 50 is easy to clean. For example, support 50 is washable with a garden hose, with or without using soapy water and a sponge, and dries quickly. Support 50, when attached to deck 30 of base 12, provides air flow under cushion 14.

Figure 5:
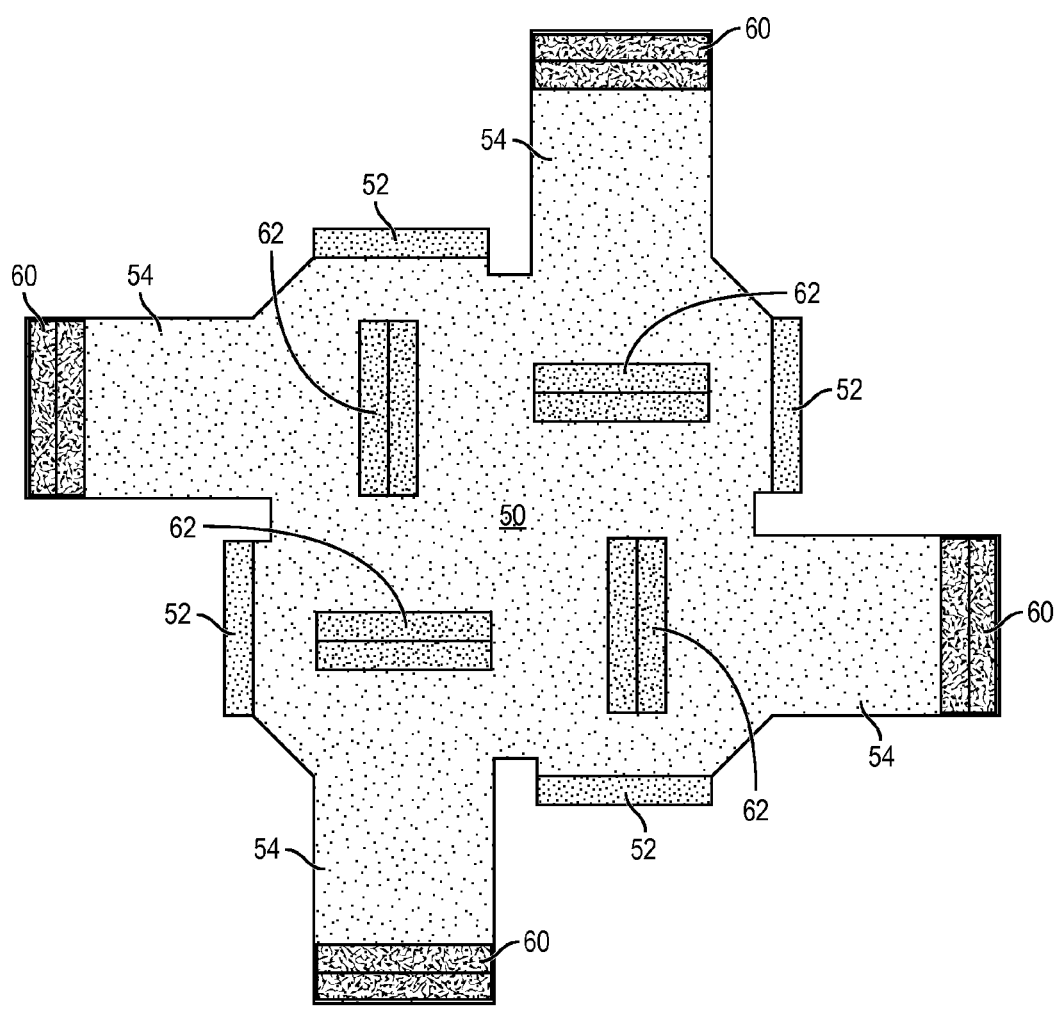
FIG. 5 illustrates a mesh support configured to be adjustably attached to a base for a pet bed.

FIG. 5 shows the bottom side of support 50. A reclosable fastener 60 is attached to the end of each flap 54. The complimentary reclosable fastener 62 is attached to the central region of support 50, as shown in FIG. 5. In one embodiment, reclosable fastener 60 and complimentary reclosable fastener 62 are double wide strips of Velcro® hook-and-loop fastener. Hook-and-loop represent one type of reclosable fasteners used for fastener 60 and fastener 62. Fastener 60 and fastener 62 also include other types of reclosable fasteners such as mushroom head fastener tape.

Figure 6:
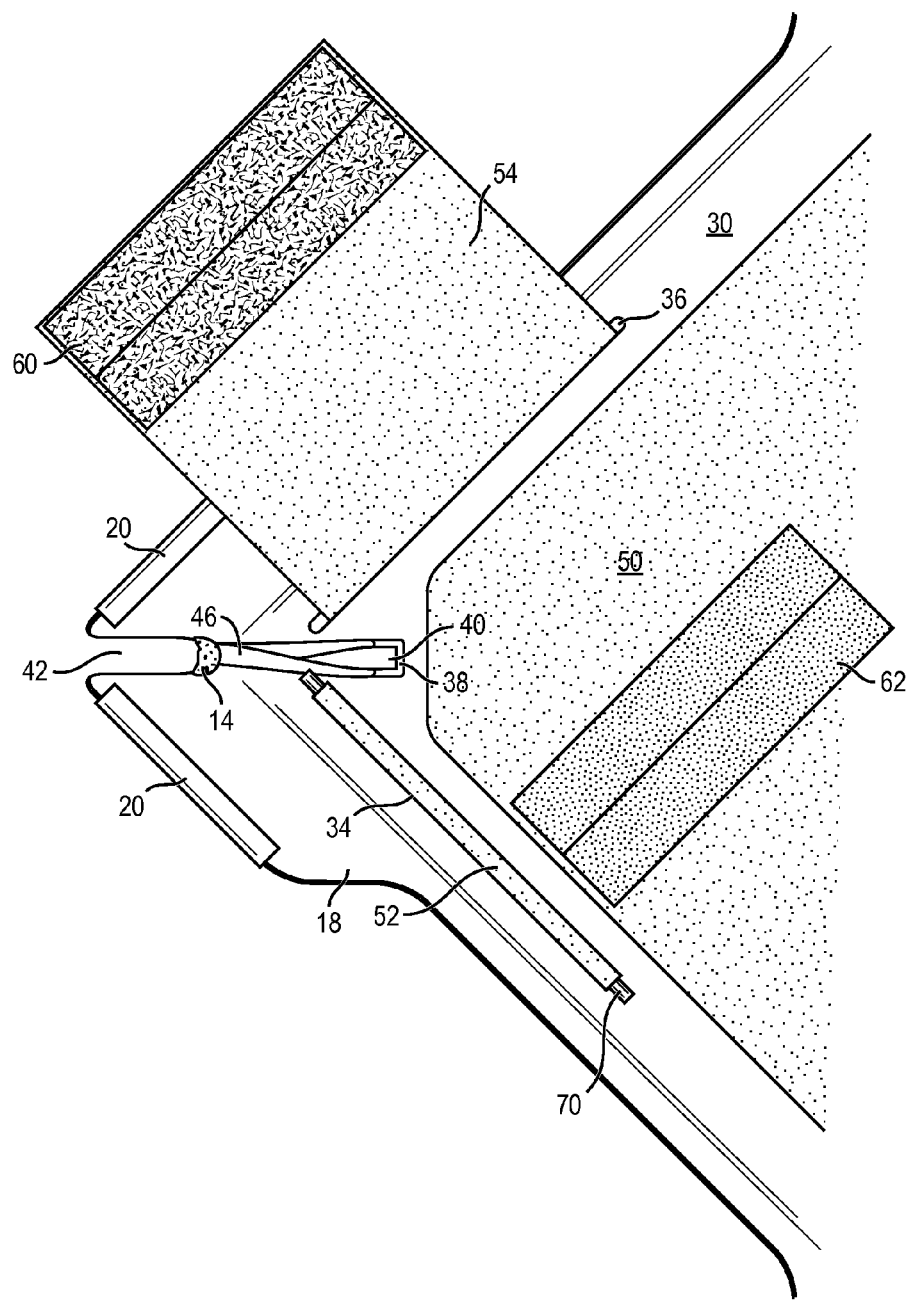
FIG. 6 illustrates an underside corner of a pet bed with a mesh support partially installed.

FIG. 6 shows a corner of pet bed 10 during installation of support 50 to base 12. First, dowel rod pocket 52 is inserted from the top of deck 30 through dowel rod pocket channel 34. Next, dowel 70 is inserted through dowel rod pocket 52. Dowel 70 securely but removably attaches dowel rod pocket 52 of support 50 to deck 30 of base 12 at dowel rod pocket channel 34. Flap 54 is inserted from the top of deck 30 through flap channel 36, opposite dowel rod pocket channel 34. Once all four dowels 70 are disposed in dowel rod pockets 52 and all four flaps 54 are disposed through flap channels 36, base 12, with legs 16 oriented upwards, and support 50 are placed over cushion 14. Loop 46 is pulled from the corner of cushion 14, through opening 42 and over tab 40, into tab channel 38. Tab 40 retains loop 46, securely but removably attaching cushion 14 to base 12. Flap 54 is pulled to a desired tension and reclosable fastener 60 is pressed against reclosable fastener 62. Reclosable fastener 60 and reclosable fastener 62 securely but removably attach flap 54 of support 50 to deck 30 of base 12 at flap channel 36. The firmness or softness of pet bed 10 is controlled by adjusting the tension of support 50. The tension of support 50 is controlled by adjusting the portion of reclosable fastener 60 pressed against reclosable fastener 62. Accordingly, reclosable fastener 60 and reclosable fastener 62 allow the pet owner to adjust the softness or firmness of pet bed 10 for the comfort of the individual pet. Base 12 is stackable with or without support 50 attached.

Cushion 14 is removed from pet bed 10 to display the reverse side of the cushion, to replace the cushion, to use the cushion as a crate cushion during travel, or to wash the cushion. To remove cushion 14 from pet bed 10, the pet bed is inverted and placed on a work surface such as the floor. Flaps 54 are pulled away from the center portion of support 50, by separating reclosable fasteners 60 from reclosable fasteners 62, exposing tab channels 38 and tabs 40. Loops 46 are pulled over tabs 40 and into openings 42 to release cushion 14. Once removed, cushion 14 is turned over and reattached to pet bed 10 to display the reverse side, replaced, or used as a crate cushion during travel. Alternatively, cushion 14 is washed in a washing machine. Cushion 14 is dried in a dryer or left to air dry. To reattach cushion 14 to pet bed 10, the cushion is placed on the work surface, such as the floor, with the desired side face down. Base 12, oriented with legs 16 upward, with support 50 partially attached, such that tab channels 38 and tabs 40 are accessible, is placed over cushion 14. Loops 46 are pulled through openings 42 and over tabs 40. Tab 40 retains loop 46, attaching cushion 14 to base 12. Loops 46 and tabs 40 securely but removably attach and hold cushion 14 in place atop deck 30 of pet bed 10 as the pet enters and exits the pet bed. Flap 54 is pulled to a desired tension and reclosable fastener 60 is pressed against reclosable fastener 62. Pet bed 10 is placed in the desired location in the home, with legs 16 oriented downward.

Figure 7:
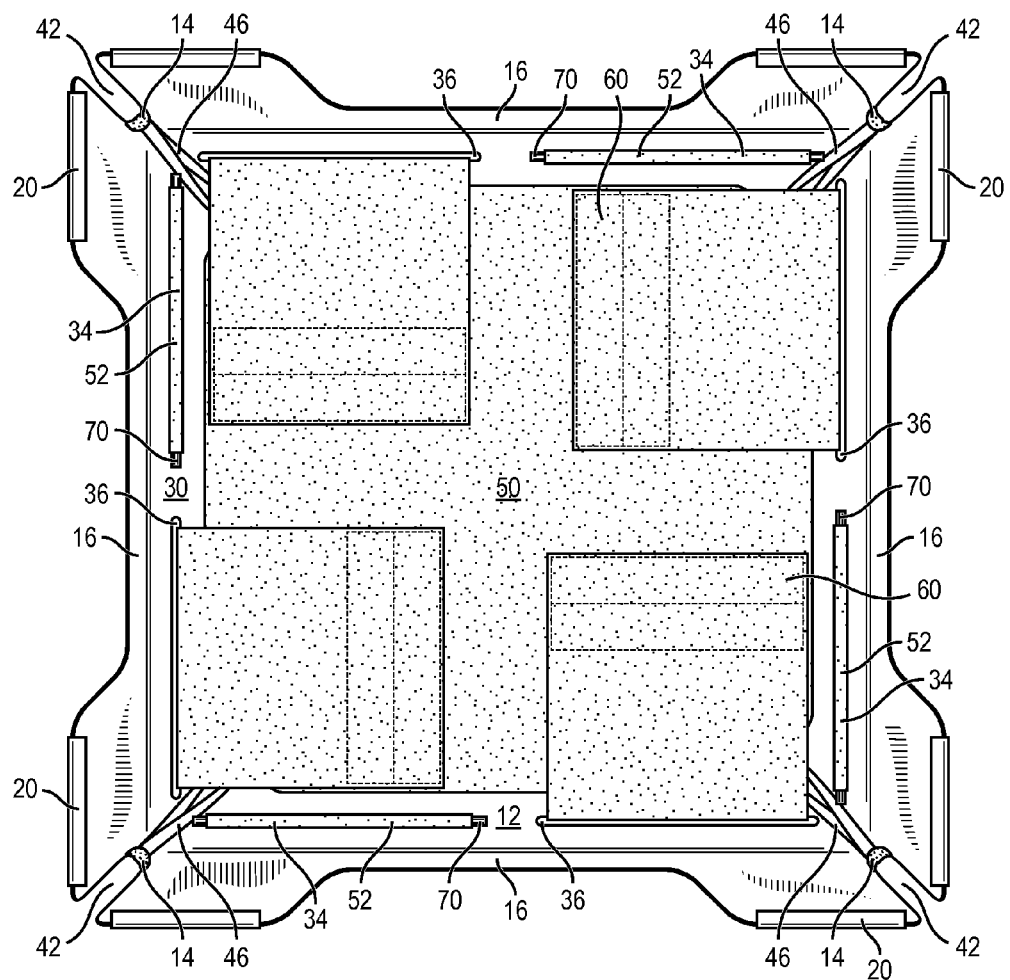
FIG. 7 illustrates a pet bed underside with an adjustable mesh support installed.

FIG. 7 shows the bottom side of assembled pet bed 10. Legs 16 support deck 30 above the floor. Dowels 70, disposed in dowel rod pockets 52, securely but removably attach the dowel rod pockets of support 50 to deck 30 of base 12 at dowel rod pocket channels 34. Reclosable fasteners 60 and reclosable fasteners 62 securely but removably attach flaps 54 of support 50 to deck 30 of base 12 at flap channels 36. Loops 46, disposed over tabs 40 and through tab channels 38, securely but removably attach and hold cushion 14 in place atop deck 30 of pet bed 10 as the pet enters and exits the pet bed.

Figure 8:
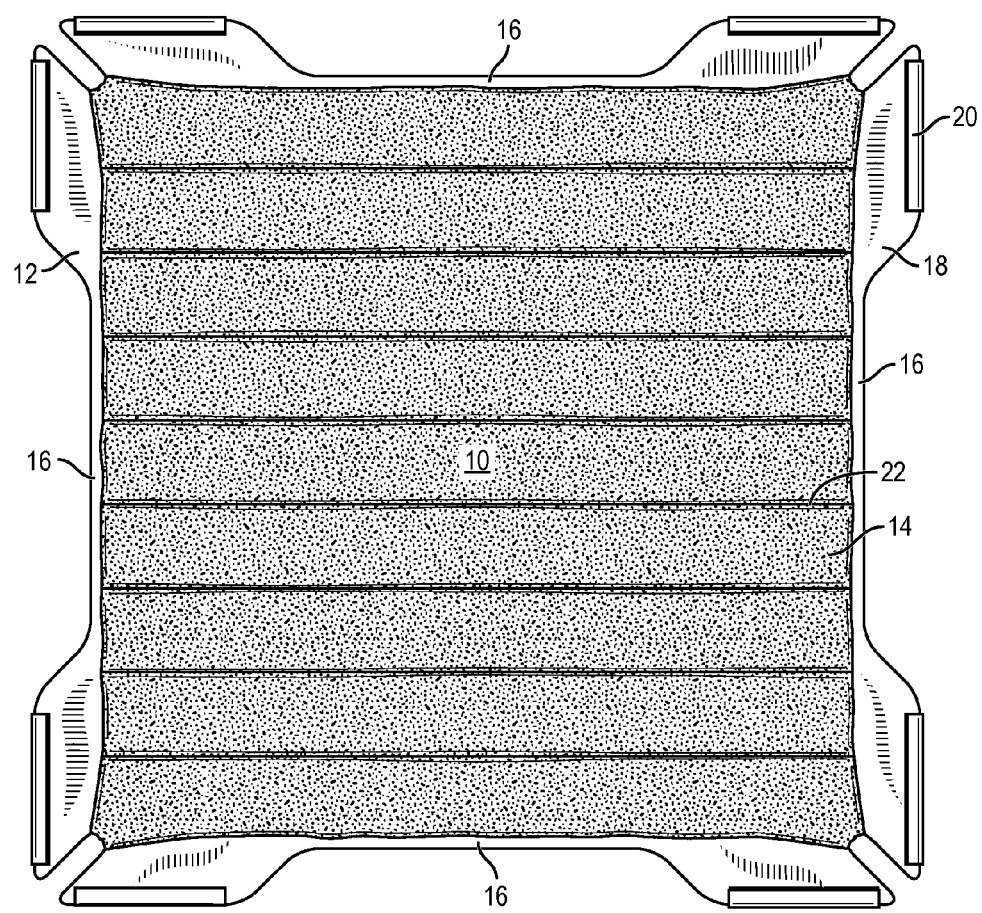
FIG. 8 illustrates a pet bed with a reversible cushion.
Figure 9:
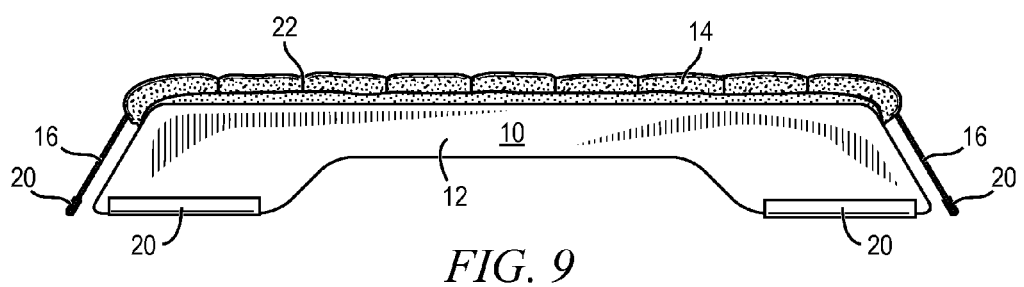
FIG. 9 illustrates the side view of the pet bed.
Figure 10:
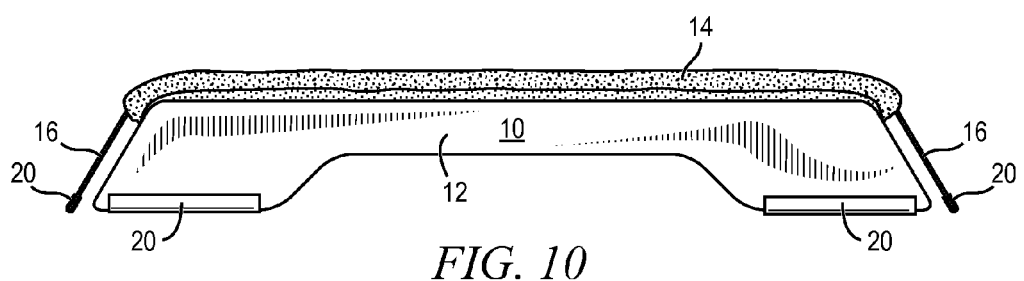
FIG. 10 illustrates the front view of the pet bed.

FIG. 8 shows a top view of pet bed 10 with cushion 14 over base 12. Legs 16 raise deck 30 (not shown) and cushion 14 off the floor. Support 50 (not shown) supports cushion 14. Legs 16 and support 50 allow air flow under cushion 14. Bumpers 20 protect the floor from scratches and increase friction between feet 18 and the floor. By increasing friction between feet 18 and the floor, bumpers 20 help keep pet bed 10 in place as the pet enters and leaves the pet bed. FIG. 9 shows a left side view of pet bed 10. Seams 22 are stitched into cushion 14 to prevent the filling from shifting, and provide an esthetically pleasing appearance. FIG. 10 shows a front view of pet bed 10.

Pet bed 10 includes a sleek, contemporary styling inspired by mid-century modern furnishings. The pet owner places pet bed 10 in any desired location. For example, Pet bed 10 is located in a bedroom, living room, family room, office, or patio. The pet owner selects a side of cushion 14 to face upwards. The pet owner may select the side of cushion 14 which is currently facing upwards. Alternatively, the pet owner selects the reverse side of cushion 14. To display the reverse side of cushion 14, the pet owner turns pet bed 10 over and places the inverted pet bed on the work surface, such as the floor. The pet owner pulls flaps 54 away from the center portion of support 50, by separating reclosable fasteners 60 from reclosable fasteners 62, to expose tab channels 38 and tabs 40. The pet owner pulls loops 46 over tabs 40 and into openings 42 to release cushion 14. The pet owner moves base 12 and support 50 away from cushion 14. The pet owner inverts cushion 14 and then places base 12 and support 50 back over inverted cushion 14. The pet owner pulls loops 46 through openings 42 and over tabs 40 to reattach cushion 14 to pet bed 10. The pet owner pulls each flap 54 against flap channel 36, to a desired tension of support 50, and presses reclosable fastener 60 against reclosable fastener 62. The pet owner places pet bed 10 in the desired location with legs 16 oriented downward. The pet owner calls the pet to pet bed 10 and pats cushion 14. Alternatively, the pet owners calls the pet to pet bed 10 and places a treat on cushion 14. The pet ascends pet bed 10. Loops 46 and tabs 40 securely but removably attach and hold cushion 14 in place atop deck 30 of pet bed 10 as the pet enters and exits the pet bed. By increasing friction between feet 18 and the floor, bumpers 20 help keep pet bed 10 in place as the pet enters and leaves the pet bed.

Figure 11:
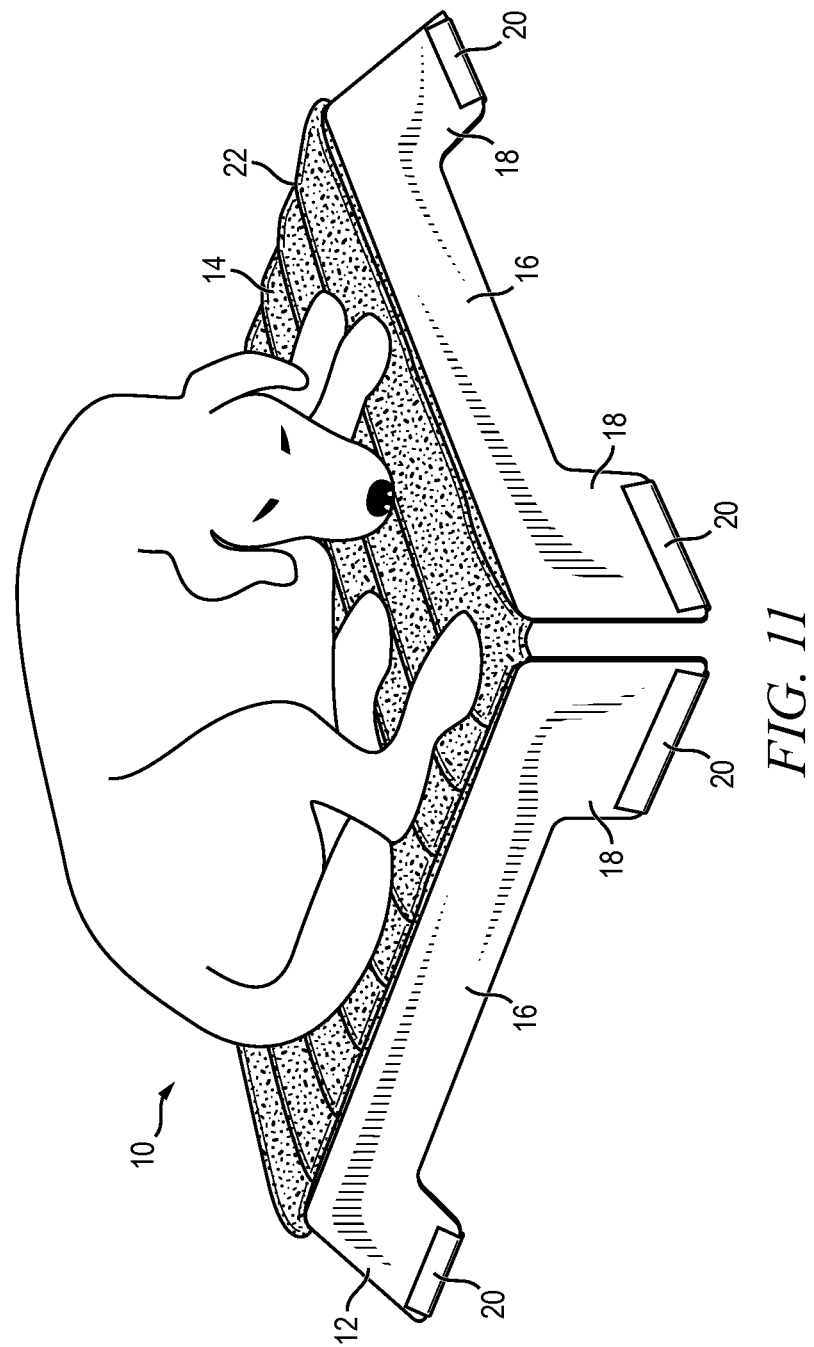
FIG. 11 illustrates the pet bed in use by a dog.

FIG. 11 shows the pet resting on pet bed 10. The pet owner observes the pet on pet bed 10. The pet owner adjusts the softness or firmness of pet bed 80 for the comfort of the individual pet by adjusting the tautness of support 50. To increase the firmness of pet bed 10, the pet owner removes the pet from the pet bed and inverts the pet bed. The pet owner pulls flaps 54 away from the center portion of support 50, by separating reclosable fasteners 60 from reclosable fasteners 62. The pet owner pulls each flap 54 more tightly against flap channel 36, increasing the tension of support 50, and presses reclosable fastener 60 against reclosable fastener 62. The pet owner places pet bed 10 in a desired location with cushion 14 oriented upwards and calls the pet to the pet bed. The pet owner entices the pet onto pet bed 10. The pet owner observes the pet on pet bed 10. To increase the softness of pet bed 10, the pet owner removes the pet from the pet bed and inverts the pet bed. The pet owner pulls flaps 54 away from the center portion of support 50, by separating reclosable fasteners 60 from reclosable fasteners 62. The pet owner pulls each flap 54 more gently against flap channel 36, decreasing the tension of support 50, and presses reclosable fastener 60 against reclosable fastener 62. The pet owner places pet bed 10 in a desired location with legs 16 oriented downward and calls the pet to the pet bed. The pet owner entices the pet onto pet bed 10. The pet owner observes the pet on pet bed 10 to ensure maximum comfort.

Figure 12:
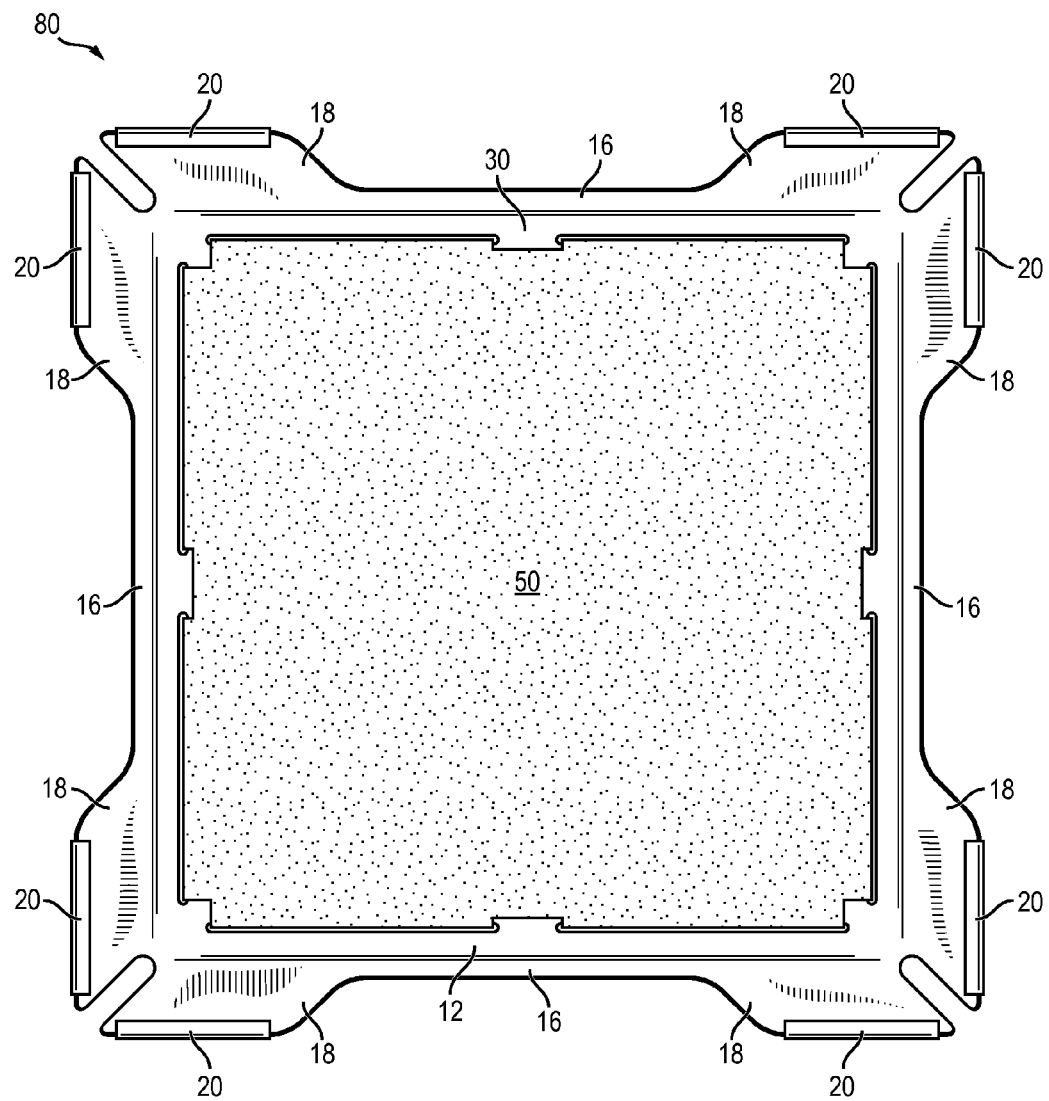
FIG. 12 illustrates a pet bed including a base and mesh support.

FIG. 12 shows pet bed 80. Pet bed 80 is similar to pet bed 10, but without cushion 14. Pets rest directly on support 50. Base 12 and support 50 are hosed off without removing support 50 from base 12. Alternatively, support 50 is removed from base 12 and both the base and support are washed. Base 12 and support 50 dry quickly. Legs 16 raise deck 30 and support 50 off the floor. Legs 16 and support 50 allow air flow under the pet. Support 50 resists damage from paws when pets enter, exit, or scratch pet bed 80. Adjusting the tautness of support 50 controls the firmness or softness of pet bed 10. Adjusting the portion of reclosable fastener 60 pressed against reclosable fastener 62 controls the tautness of support 50. Accordingly, reclosable fastener 60 and reclosable fastener 62 allow the pet owner to adjust the softness or firmness of pet bed 80 for the comfort of the individual pet.

Pet bed 10 offers many advantages over existing pet bedding options. Pet bed 10 is easy to clean. All components of pet bed 10 are washable. For example, base 12 is washable using a garden hose. Bumpers 20 are washable using a garden hose, with or without using soapy water and a sponge. Support 50 is washable using a garden hose and dries easily. Cushion 14 is machine washable and dryable. Pet bed 10 comprising base 12, cushion 14, bumpers 20, support 50, and dowels 70, is able to be fully assembled and disassembled in the home with no tools. All components of pet bed 10 are removably attached. Bumpers 20 are removably attached to base 12. Support 50 is removably attached to base 12. Cushion 14 is removably attached to base 12. Dowels 70 are removably attached to support 50. Friction securely but removably attaches and holds bumper 20 to foot 18. Dowels 70, disposed in dowel rod pockets 52, securely but removably attach the dowel rod pockets of support 50 to deck 30 of base 12 at dowel rod pocket channels 34. Reclosable fasteners 60 and reclosable fasteners 62 securely but removably attach flaps 54 of support 50 to deck 30 of base 12 at flap channels 36. Loops 46, disposed over tabs 40 and through tab channels 38, securely but removably attach cushion 14 to deck 30 of base 12.

Pet bed 10 offers more advantages over existing pet bedding options. Base 12 is stackable with or without support 50 attached. Cushion 14 is reversible, with two different solid or print fabrics. Cushion 14 functions as a crate cushion when traveling, providing the pet with familiar smells and reducing the stress of traveling on the pet. Seams 22 are stitched into cushion 14 to prevent the filling from shifting, providing consistent comfort to the pet. Seams 22 provide an esthetically pleasing appearance. Loops 46 and tabs 40 securely but removably attach and hold cushion 14 in place atop deck 30 of pet bed 10 as the pet enters and exits the pet bed. Bumpers 20 protect the floor from scratches and increase friction between feet 18 and the floor. By increasing friction between feet 18 and the floor, bumpers 20 help keep pet bed 10 in place as the pet enters and leaves the pet bed. The firmness or softness of pet bed 10 is controlled by adjusting the tautness of support 50. The tautness of support 50 is controlled by adjusting the portion of reclosable fastener 60 pressed against reclosable fastener 62. Accordingly, reclosable fastener 60 and reclosable fastener 62 allow the pet owner to adjust the softness or firmness of pet bed 10 for the comfort of the individual pet.

The support structure of the present invention lends itself to multiple variations, without departing from the scope of the present invention. In one embodiment, base 12 is foldable. For example, base 12 may include a hinge. In another embodiment, base 12 is configured in separable pieces, for travel. In one embodiment, two opposing legs 16 each include three or more feet 18. In one embodiment, two opposing sides of deck 30 each include three or more channels 34 and 36. In one embodiment, pet bed 10 is triangular. Triangular pet bed 10 is ideally suited to place in a corner of a room. A long dowel 70 and dowel rod pocket 52 secure support 50 to the hypotenuse side of triangular base 12, while flaps 54 secure support 50 to the adjacent sides of triangular base 12.

In one embodiment, support 50 includes more than one segment. For example, support 50 includes four segments. Each segment includes a dowel rod pocket 52 and a flap 54. Each segment runs from a dowel rod pocket channel 34 to a flap channel 36 of base 12, directly across from the dowel rod pocket channel. In one embodiment, support 50 includes no dowel rod pockets. In place of each dowel rod pocket 52, support 50 includes a second flap. Flaps are angled, allowing reclosable fastener 60 attached to all flaps access to reclosable fastener 62 attached to the central portion of support 50.

In one embodiment, support 50 is permanently attached to base 12. A portion of support 50 is disposed through dowel rod pocket channel 34 or flap channel 36 and sewn, glued, fused, stapled, or otherwise attached to the remaining portion of support 50. Alternatively, a portion of support 50 is glued, nailed, stapled, fused, bonded, or otherwise attached to base 12.

While one or more embodiments of the present invention have been illustrated in detail, the skilled artisan will appreciate that modifications and adaptations to those embodiments may be made without departing from the scope of the present invention as set forth in the following claims.

What is claimed:
1. A method of making a pet bed, comprising:
   providing a rigid base;
   attaching a support member configured to be removable to the rigid base; and
   attaching a cushion configured to be removable to the rigid base over the support member by,
   (a) forming a first channel in the rigid base,
   (b) disposing a first portion of the support member through the first channel,
   (c) securing the first portion of the support member to the rigid base,
   (d) forming a second channel in the rigid base across from the first channel;
   (e) disposing a second portion of the support member through the second channel, and
   (f) securing the second portion of the support member to the rigid base.
2. The method of claim 1, wherein a tension of the support member is adjustable.
3. The method of claim 1, wherein the rigid base is washable.
4. The method of claim 1, wherein the support member is washable.
5. The method of claim 1, wherein the cushion is reversible.
6. The method of claim 1, wherein the cushion is washable.

* * * * *